United States Patent
Kanaya

(10) Patent No.: US 7,817,968 B2
(45) Date of Patent: Oct. 19, 2010

(54) TRANSMITTER AND RECEIVER CIRCUIT

(75) Inventor: Ko Kanaya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 778 days.

(21) Appl. No.: 11/623,339

(22) Filed: Jan. 16, 2007

(65) Prior Publication Data

US 2008/0081568 A1    Apr. 3, 2008

(30) Foreign Application Priority Data

Oct. 3, 2006    (JP)    ............................. 2006-272063

(51) Int. Cl.
    H04B 1/02    (2006.01)
(52) U.S. Cl. .................. 455/101; 455/86; 455/118; 455/334
(58) Field of Classification Search ............. 455/86, 455/101–103, 272, 318, 87, 118–120, 319, 455/334
    See application file for complete search history.

(56) References Cited

U.S. PATENT DOCUMENTS

| | | | |
|---|---|---|---|
| 4,494,118 A * | 1/1985 | Graves | 342/424 |
| 5,408,690 A * | 4/1995 | Ishikawa et al. | 455/115.4 |
| 5,583,511 A * | 12/1996 | Hulderman | 342/175 |
| 6,100,841 A * | 8/2000 | Toth et al. | 342/149 |
| 6,351,236 B1 | 2/2002 | Hasler | |
| 6,704,818 B1 * | 3/2004 | Martin et al. | 710/100 |
| 7,072,613 B2 * | 7/2006 | Tanaka et al. | 455/13.3 |
| 7,508,860 B2 * | 3/2009 | Hyun et al. | 375/130 |
| 7,697,632 B2 * | 4/2010 | Khlat et al. | 375/316 |
| 2003/0022644 A1 * | 1/2003 | Imai | 455/217 |
| 2003/0045262 A1 * | 3/2003 | Vaughan | 455/323 |
| 2005/0064840 A1 * | 3/2005 | Heydari et al. | 455/323 |
| 2005/0140470 A1 * | 6/2005 | Tamaki et al. | 333/202 |
| 2005/0141602 A1 * | 6/2005 | Hyun et al. | 375/219 |
| 2005/0190099 A1 * | 9/2005 | Nagasaku | 342/149 |
| 2005/0285541 A1 * | 12/2005 | LeChevalier | 315/169.3 |
| 2007/0120732 A1 * | 5/2007 | Tamaki et al. | 342/175 |
| 2007/0207761 A1 * | 9/2007 | LaBerge et al. | 455/277.1 |

FOREIGN PATENT DOCUMENTS

| | | |
|---|---|---|
| DE | 103 45 971 B4 | 5/2005 |
| EP | 1 152 254 A2 | 11/2001 |
| JP | 2000-286601 | 10/2000 |
| JP | 2001-007651 | 1/2001 |
| JP | 2003-078303 | 3/2003 |
| JP | 2006-050472 | 2/2006 |

OTHER PUBLICATIONS

Itoh et al., *A 40 GHz Band Monolithic Even Harmonic Mixer With an Antiparallel Diode Pair*, 1999 IEEE MTTS Int. Microwave Symp. Dig., pp. 879-882, 1991.

Kanaya et al., *A 94 GHz High Performance Quadruple Subharmortio Mixer MMIC*, 2002 IEEE MTT-S Int. Microwave Symp. Dig., pp. 1249-1252, 2002.

* cited by examiner

Primary Examiner—Nhan Le
(74) Attorney, Agent, or Firm—Leydig, Voit & Mayer, Ltd.

(57) ABSTRACT

A transmitter and receiver circuit includes antennas for receiving high-frequency signals; a local oscillator for generating local oscillation signals; mixers connected to respective antennas for converting the frequency of the high-frequency signals from corresponding antennas in response to the high-frequency signals input from the local oscillator; and a switch for inputting the local oscillation signals generated by the local oscillator into a selected one of the mixers so that receiving channels are switched by the switch.

6 Claims, 6 Drawing Sheets

TRANSMITTER AND RECEIVER CIRCUIT

BACKGROUND OF THE INVENTION

1. Field of the Invention

The present invention relates to a transmitter and receiver circuit using microwaves or millimetric-waves.

2. Background Art

In a transmitter and receiver circuit using microwaves or millimetric-waves, high-frequency signals are received from a plurality of antennas, and converted down to intermediate frequencies by a mixer (for example, refer to Japanese Patent Laid-Open No. 2001-7651).

FIG. 9 is a block diagram showing an example of a conventional transmitter and receiver circuit. The transmitter and receiver circuit has a plurality of antennas 11a to 11e that receive high-frequency signals, a switch 41 that selects any one of the plurality of antennas 11a to 11e, a low-noise amplifier 42 that amplifies high-frequency signals from the selected one of the antennas 11a to 11e, a local oscillator 12 that generates local oscillation signals, a power amplifier 13 that amplifies the local oscillation signals, a coupler 14 that divides the amplified local oscillation signals, and a mixer 15 that converts the frequency of the high-frequency signals from the selected one of the antennas 11a to 11e in response to the local oscillation signals inputted from the local oscillator 12.

If the switch 41 is provided in a part of a high-frequency circuit, since the passage loss of the switch 41 cannot be ignored in micro wave or millimetric-wave band, the noise index of the transmitter and receiver circuit is elevated. Whereas, although the loss of the switch 41 can be compensated by installing a low-noise amplifier 42, the number of components is increased, and the manufacturing costs of the transmitter and receiver circuit are elevated.

FIG. 10 is a block diagram showing another example of a conventional transmitter and receiver circuit. In this transmitter and receiver circuit, a plurality of mixers 15a to 15e connected to a plurality of antennas 11a to 11e, respectively, operate in parallel. By installing the switch in the local oscillation circuit side instead of installing the switch in the high-frequency circuit side, receiving channels can be switched without increasing the receiving noise. However, in this transmitter and receiver circuit, a five-way distributor 43 corresponding to the number of mixers 15a to 15e must be used.

Since the theoretical loss of the five-way distributor 43 is as large as 7 db, to excite the mixers 15a to 15e, amplifiers 44a to 44e having a gain of 7 db or more are required corresponding to the number of mixers 15a to 15e. However, if amplifiers 44a to 44e are installed, the size of the transmitter and receiver circuit is enlarged, and manufacturing costs are elevated. Especially in the millimetric-wave band, the design of a distributor having a low loss and equipartition characteristics is extremely difficult.

SUMMARY OF THE INVENTION

To solve the above-described problems, it is an object of the present invention to provide a transmitter and receiver circuit that requires no power amplifiers to compensate local oscillation signals and no complicated distributors having large loss, and can switch receiving channels without increasing receiving noise.

According to one aspect of the present invention, a transmitter and receiver circuit has a plurality of antennas for receiving high-frequency signals, a local oscillator for generating local oscillation signals, a plurality of mixers connected to the plurality of antennas, for converting the frequency of the high-frequency signals from corresponding antennas in response to the local oscillation signals inputted from the local oscillator, and a switch for making local oscillation signals generated by the local oscillator input into any one of the plurality of mixers; wherein receiving channels are switched by the switch.

According to the present invention, a transmitter and receiver circuit that requires no power amplifiers to compensate local oscillation signals and no complicated distributors having large loss, and can switch receiving channels without increasing receiving noise can be provided.

Other and further objects, features and advantages of the invention will appear more fully from the following description.

DETAILED DESCRIPTION OF THE PREFERRED EMBODIMENTS

First Embodiment

Figure 1:
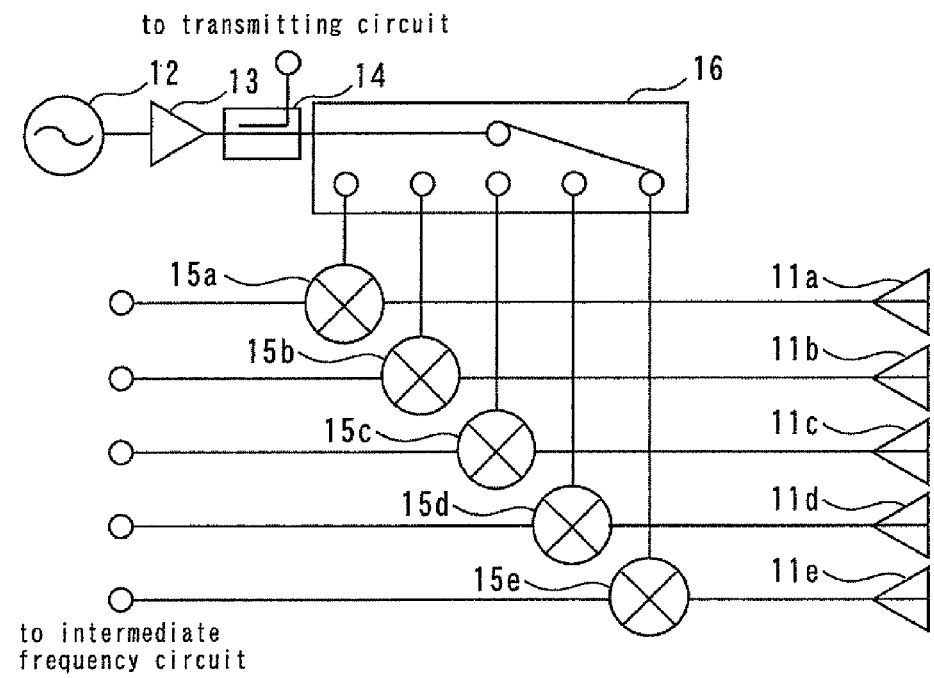
FIG. 1 is a diagram showing a transmitter and receiver circuit according to the first embodiment of the present invention.

FIG. 1 is a diagram showing a transmitter and receiver circuit according to the first embodiment of the present invention. The transmitter and receiver circuit has a plurality of antennas 11a to 11e for receiving high-frequency signals; a local oscillator 12 for generating local oscillation signals; a power amplifier 13 for amplifying the local oscillation signals; a coupler 14 for dividing the amplified local oscillation signals; a plurality of mixers 15a to 15e for converting the frequencies of high-frequency signals from corresponding antennas in response to the local oscillation signals inputted from the local oscillator 12; and a switch 16 for making the local oscillation signals generated by the local oscillator 12 input into any one of the plurality of mixers 15a to 15e.

In this transmitter and receiver circuit, the switch 16 is not installed in the high-frequency circuit side, but is installed in the local oscillation circuit side, and the mixers 15a to 15e are turned on or off by switching the power levels of the local oscillation signals inputted into the mixers 15a to 15e by the switch 16. Specifically, receiving channels are switched by the switch 16. Thereby, receiving channels can be switched without increasing receiving noise. There is no need to install power amplifiers for compensating local oscillation signals for each of the mixers 15a to 15e. A complicated distributor having a large loss is not also required.

Figure 2:
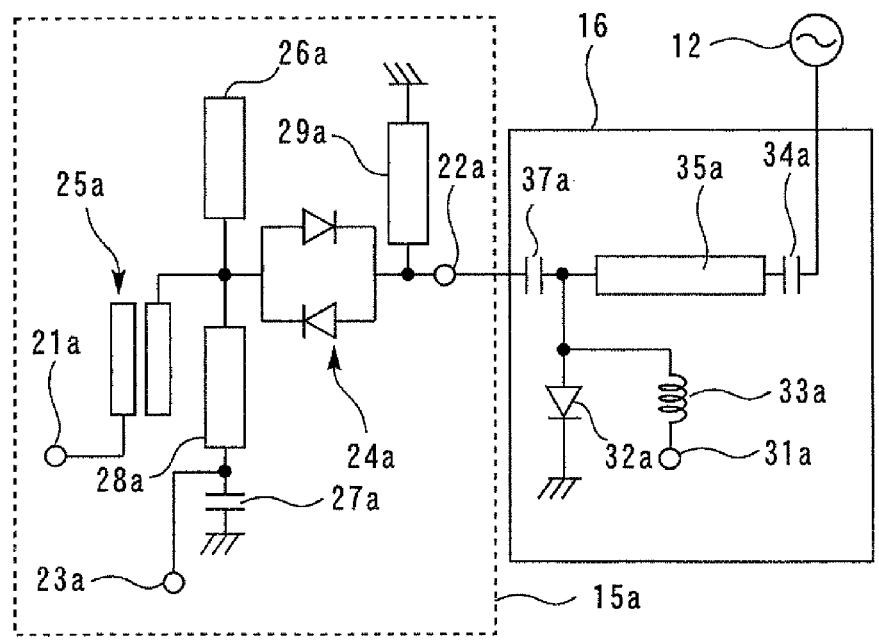
FIG. 2 is a circuit diagram showing a switch and a mixer when one mixer is used in a transmitter and receiver circuit according to the first embodiment of the present invention.

FIG. 2 is a circuit diagram showing a switch and a mixer when one mixer is used in a transmitter and receiver circuit according to the first embodiment of the present invention.

The mixer 15a is a harmonic mixer using an APDP (anti-parallel diode pair) wherein two diodes are connected in inverse-parallel as mixing elements. The mixer 15a generates the harmonic (higher harmonic wave) components of local oscillation signals based on the non-linearity of the mixing elements, and by the mixing elements, intermediate frequency signals corresponding to the frequency difference between the harmonic components and inputted high-frequency signals are obtained.

Specifically, the mixer 15a has an RF terminal 21a for inputting high-frequency signals from corresponding antennas; an LO terminal 22a for inputting local oscillation signals from the local oscillator 12 through the switch 16; an IF terminal 23a for outputting intermediate frequency signals; an APDP 24a one end of which is connected to the LO terminal 22a; a coupled transmission line 25a one end of which is connected to the RF terminal 21a and the other end is connected to the other end of the APDP 24a; an open stub 26a connected to the connecting point of the APDP 24a to the coupled transmission line 25a; a short stub 28a one end of which is connected to the connecting point of the APDP 24a to the coupled transmission line 25a, the other end is connected to the IF terminal 23a, and grounded through a capacitor 27a; and a short stub 29a one end of which is connected to the connecting point of the LO terminal 22a to the APDP 24a, and the other end is grounded. The open stub 26a and the short stub 29a have a length of ¼ the wavelength of the local oscillation signals, and the short stub 28a and the coupled transmission line 25a have a length of ¼ the wavelength of the high-frequency signals.

On the other hand, the switch 16 has a switching terminal 31a for supplying a bias voltage; a diode 32a whose cathode is grounded and anode is connected to the LO terminal of the mixer 15a; an RF choke 33a one end of which is connected to the switching terminal 31a, and the other end is connected to the anode of the diode 32a; and a transmission line 35a one end of which is connected to the anode of the diode 32a through a capacitor 37a for DC cutting, and the other end is connected to the local oscillator 12 through a capacitor 34a for DC cutting. The transmission line 35a has a length of ¼ the length of local oscillation signals.

In the above-described transmitter and receiver circuit, when the diode 32a is ON, since the other end side of the transmission line 35a has a high impedance at the frequency of the local oscillation signals by the diode 32a and the transmission line 35a, the local oscillation signals are not inputted into the mixer 15a. On the other hand, when the diode 32a is OFF, the local oscillation signals are inputted into the mixer 15a, and intermediate frequency signals are outputted.

Figure 3:
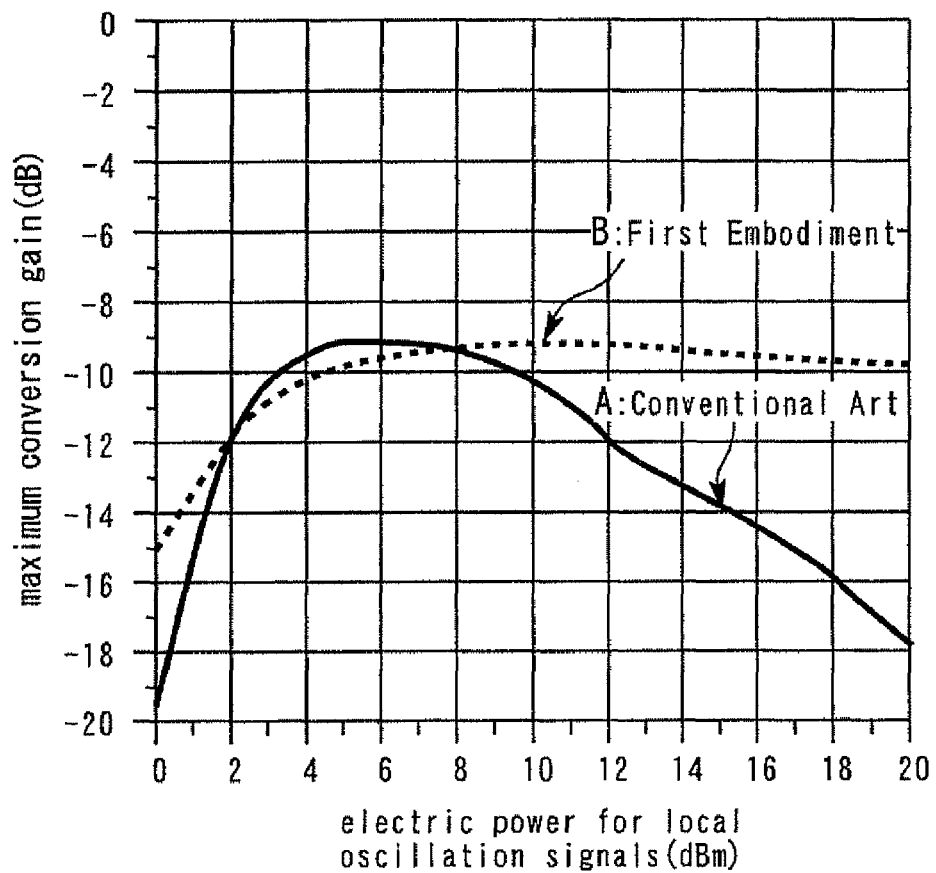
FIG. 3 is a diagram showing the dependence of the conversion gain of the single mixer on the power of local oscillation signals.

FIG. 3 is a diagram showing the dependence of the conversion gain of the single mixer on the power of local oscillation signals. Normally, the conversion gain of a harmonic mixer becomes constant after sharp increase in the region of low power of the local oscillation signals, thereafter decreases with increase in the local oscillation signals.

Figure 4:
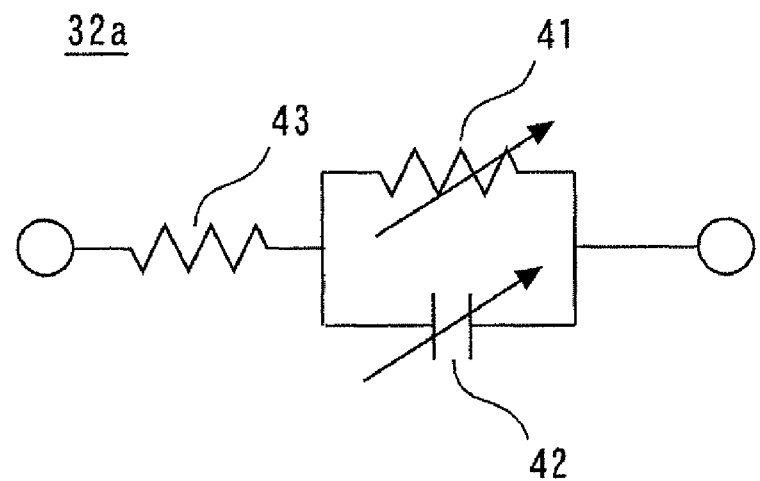
FIG. 4 is an equivalent circuit schematic of a diode.

Here, as FIG. 4 shows, the diode 32a can be illustrated by a variable resistor 41 and a variable capacitor 42 connected to each other in parallel, and a resistor 43 serially connected thereto. In the low anode voltage region, since the resistance component is small and the capacity component is dominant, the diode 32a functions as a high-impedance capacitor. On the other hand, in the high anode voltage region of the rising voltage of the diode or higher, since the capacity component is small and the resistance component is dominant, the diode 32a functions as a low-impedance capacitor. Therefore, the diode functions as a high-impedance capacitor in the region where the local oscillation signals are low, and as a low-impedance resistor in the region where the local oscillation signals are high.

Since the impedance of the diode 32a is lowered when local oscillation signals are increased; therefore, a part of the local oscillation signals inputted into the mixer 15a are grounded through the diode 32a. Consequently, the local oscillation signals inputted into the mixer 15a are substantially decreased. Therefore, as the curve B in FIG. 3 shows, a high conversion gain can be maintained within a wide range of the local oscillation signals. On the contrary, if characteristics like the curve A are required, it is only necessary to control so as to lower the bias voltage when the switching element is turned OFF.

Figure 5:
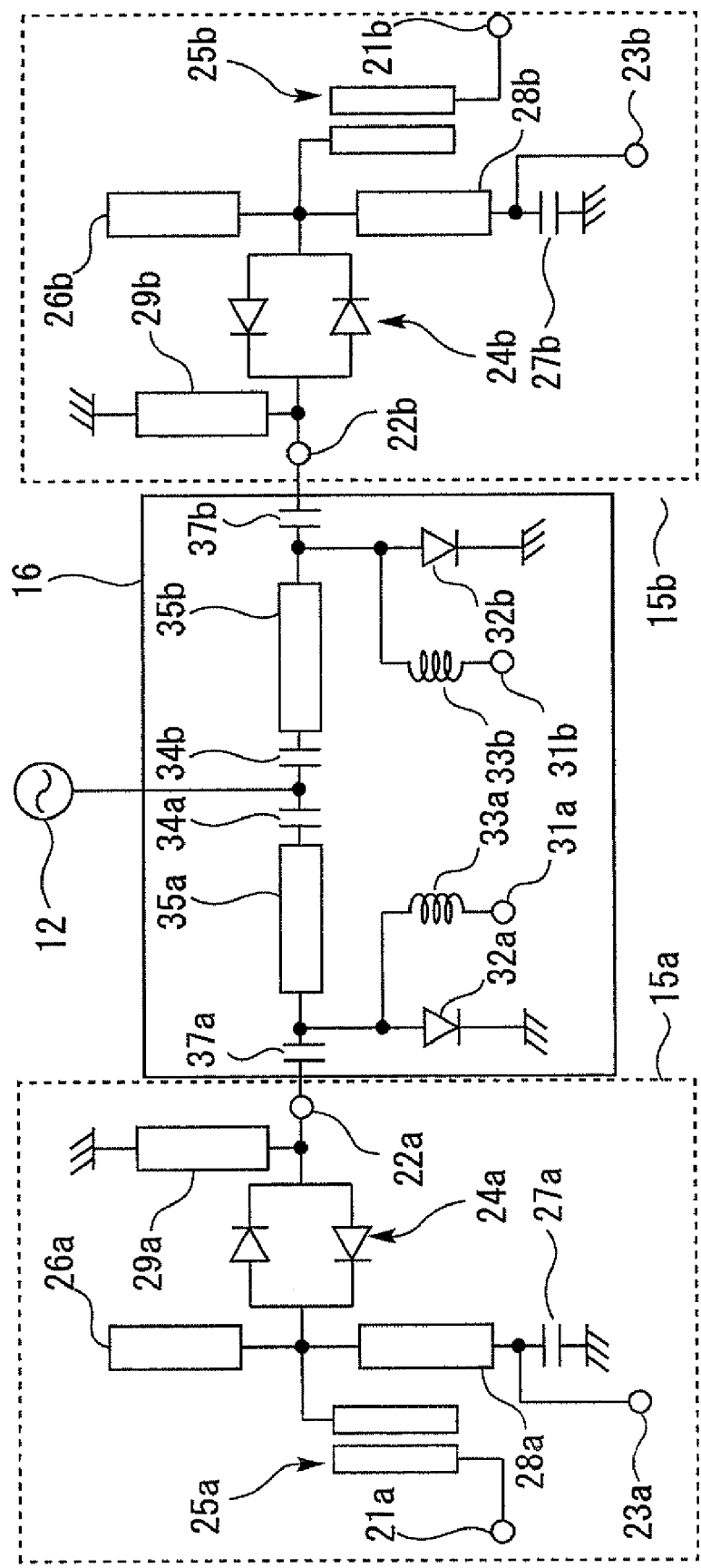
FIG. 5 is a circuit diagram showing a switch and a mixer when two mixers are used in a transmitter and receiver circuit according to the first embodiment of the present invention.

FIG. 5 is a circuit diagram showing a switch and a mixer when two mixers are used in a transmitter and receiver circuit according to the first embodiment of the present invention. Not only is the mixer 15a shown in FIG. 2, but also the mixer 15b equivalent to the mixer 15a installed.

As in the mixer 15a, the mixer 15b has an RF terminal 21b, an LO terminal 22b, an IF terminal 23b, an APDP 24b, a coupling transmission line 25b, an open stub 26b, a capacitor 27b, and short stubs 28b and 29b. Each of the open stub 26b and the short stub 29b has a length of ¼ the wavelength of the local oscillation signals; and each of the short stub 28b and the coupling transmission line 25b of ¼ the wavelength of the high-frequency signals.

In the same way as in FIG. 2, the switch 16 has not only a switching terminal 31a, a diode 32a, an RF choke 33a, a capacitor 34a, and a transmission line 35a; but also a switching terminal 31b for supplying a bias voltage, a diode 32b whose cathode is grounded and anode is connected to the LO terminal of the corresponding mixer 15b, an RF choke 33b one end of which is connected to the switching terminal 31b and the other end is connected to the anode of the diode 32b, and a transmission line 35b one end of which is connected to the anode of the diode 32b through the capacitor 37b for DC cutting and the other end is connected to the local oscillator 12 through the capacitor 34b for DC cutting. The transmission line 35b has a length of ¼ the wavelength of the local oscillation signals.

Here, to turn the diode 32a off and the diode 32b on, 0.3 V is supplied to the switching terminal 31a and 1 V is supplied to the switching terminal 31b. In this case, since the other end side of the transmission line 35b is in a high impedance state in the frequency of local oscillation signals due to the diode 32b and the transmission line 35b, the local oscillation signals are not inputted into the mixer 15b, but only inputted into the mixer 15a. By the capacitors 34a and 34b, the influence of the bias voltage for switching to the other mixer is prevented.

Even when two mixers are thus operated in parallel, since the local oscillation signals for operating one mixer is required, there is no necessity to install a power amplifier for compensating local oscillation signals for each mixer, and no complicated distributors having large loss are required. In addition, there is no necessity to newly design each unit mixer, but a commercially available mixer MMIC chip can be used on a high-frequency substrate, and the developing costs can be reduced. Although the case of two mixers was described above, the present invention can also be applied to the cases of three or more mixers.

Figure 6:
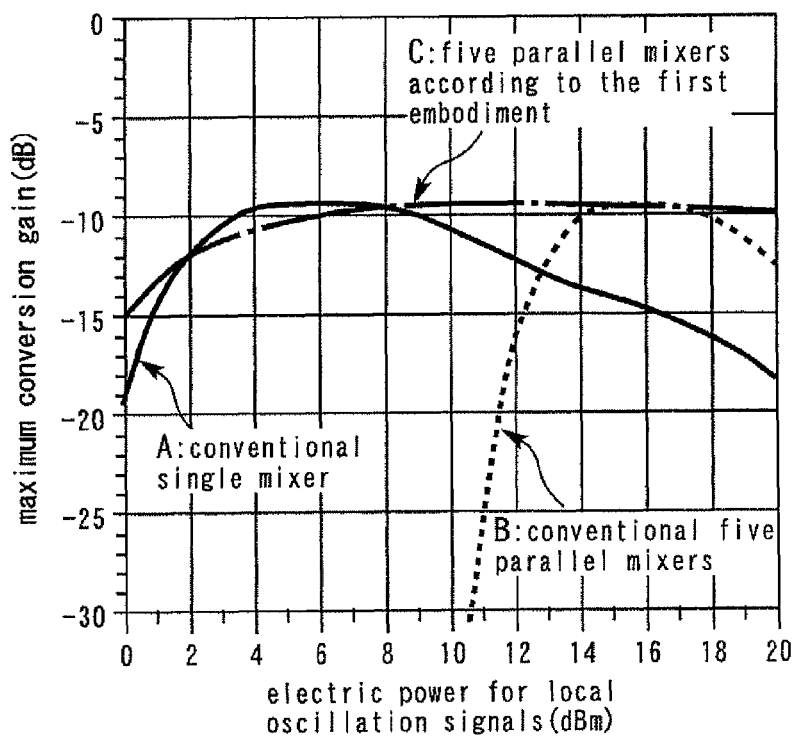
FIG. 6 is a diagram showing the dependence of the conversion gain of five parallel mixers wherein five single mixers connected in parallel on the power of local oscillation signals.

FIG. 6 is a diagram showing the dependence of the conversion gain of five parallel mixers wherein five single mixers connected in parallel on the power of local oscillation signals. The curve A indicates a conventional single mixer; the curve B indicates conventional five parallel mixers having no switching terminals; and the curve C indicates five parallel mixers according to the first embodiment. The electric power for local oscillation signals of the maximum conversion gain is 6 dBm in the single mixer (curve A); while it is 15 dBm in the conventional five parallel mixers (curve B), 9 dBm higher than that for the single mixer. On the other hand, in five parallel mixers according to the first embodiment (curve C), the electric power for local oscillation signals of the maximum conversion gain is equivalent to that for the single mixer even though five mixers are used. In addition, in five parallel mixers according to the first embodiment (curve C), the conversion gain is not decreased even if local oscillation signals increase, and is maintained constant.

Therefore, according to the transmitter and receiver circuit according to the first embodiment, since a high conversion gain can be maintained within a wide range of electric powers for local oscillation signals, the temperature characteristics and manufacturing fluctuation of the output of the local oscillator 12 and the gain of the power amplifier 13 can be absorbed by the mixer.

In the first embodiment, a diode is used as the switching element. Thereby, the OFF capacity of the switching element can be lowered, and the loss in the input of local oscillation signals can be reduced. A transistor can also be used as the switching element. Thereby, power consumption can be lowered, and the bias circuit can be simplified. It can be formed on the same chip if the same process for the mixing element is used. As the switching element, an MEMS (micro electro mechanical systems) switch can also be used. Thereby, the OFF capacity of the switching element can be lowered, the loss in the input of local oscillation signals can be reduced, and power consumption can be lowered. It can be formed on the same chip if the same process for the mixing element is used.

Second Embodiment

Figure 7:
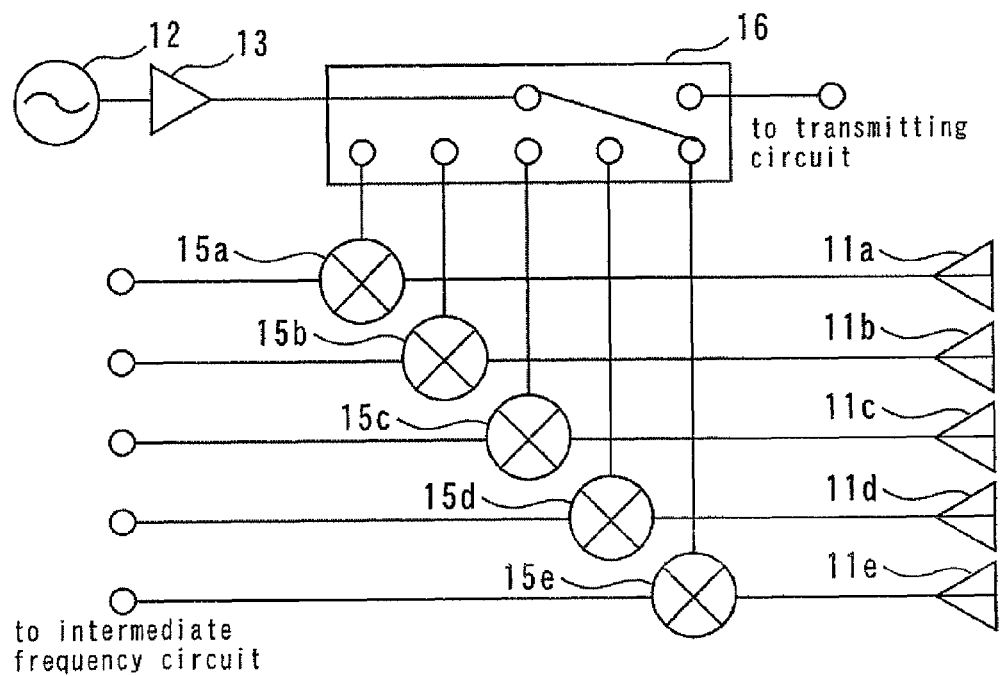
FIG. 7 is a diagram showing a transmitter and receiver circuit according to the second embodiment of the present invention.

FIG. 7 is a diagram showing a transmitter and receiver circuit according to the second embodiment of the present invention. In this transmitter and receiver circuit, a port to the transmitting circuit is added to the switch 16. The switch 16 makes local oscillation signals generated by a local oscillator 12 input into any one of a plurality of mixers 15a to 15e or a transmitter circuit. Specifically, the receiving channels, and transmission and reception are switched by the switch 16. Other configurations are identical to the configurations of the first embodiment. Thereby, the receiving channels can be switched as in the first embodiment, and the reception mode and the transmission mode can also be switched.

Third Embodiment

Figure 8:
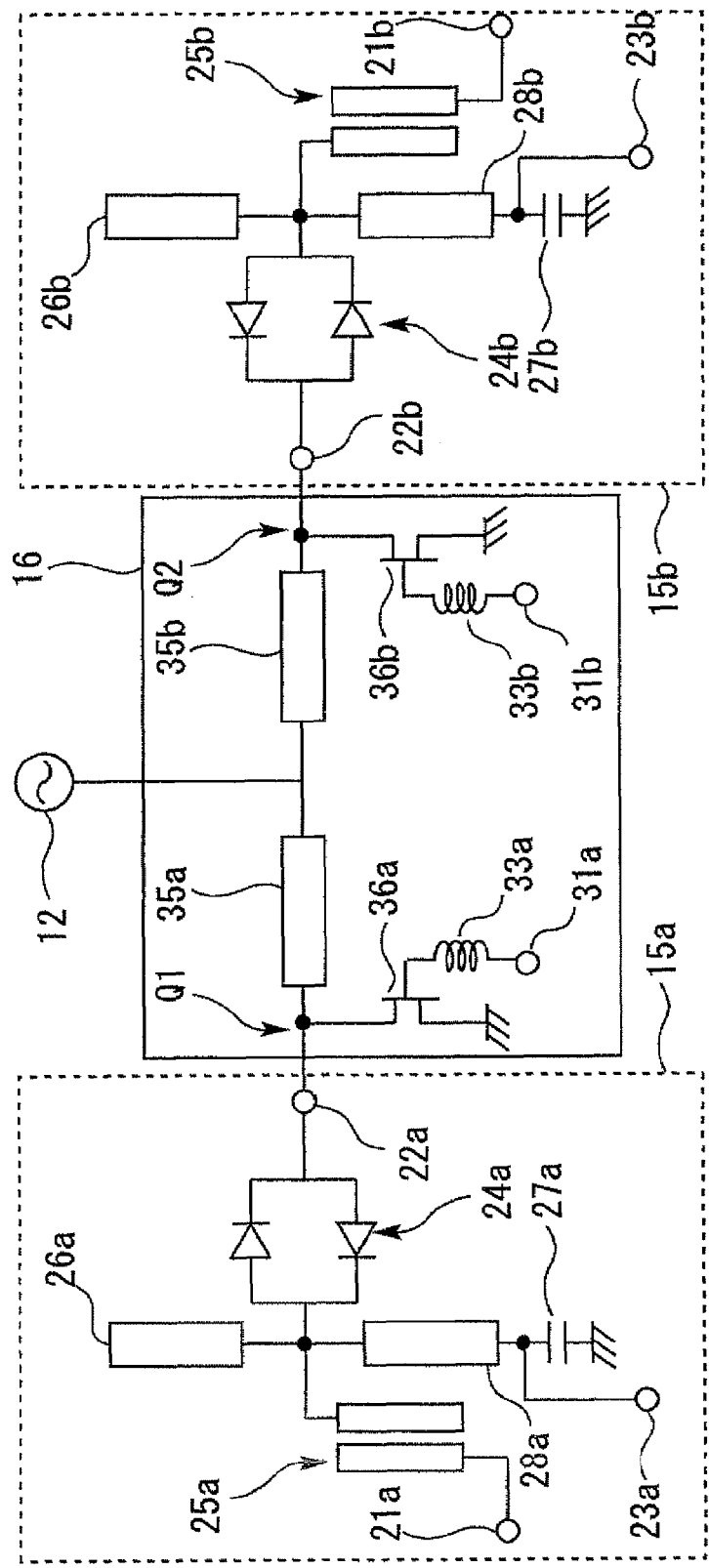
FIG. 8 is a circuit diagram showing a switch and a mixer when two mixers are used in a transmitter and receiver circuit according to the third embodiment of the present invention.
Figure 9:
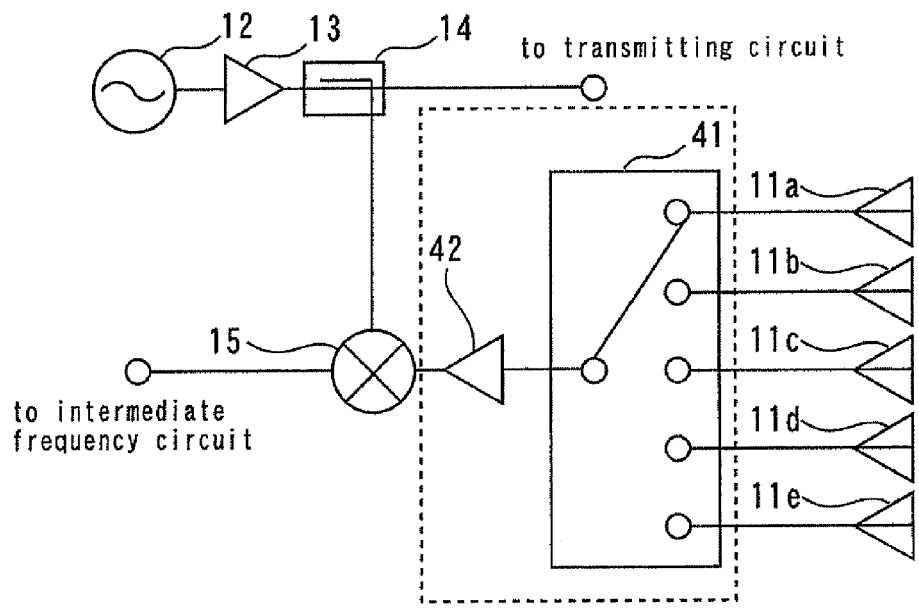
FIG. 9 is a block diagram showing an example of a conventional transmitter and receiver circuit.
Figure 10:
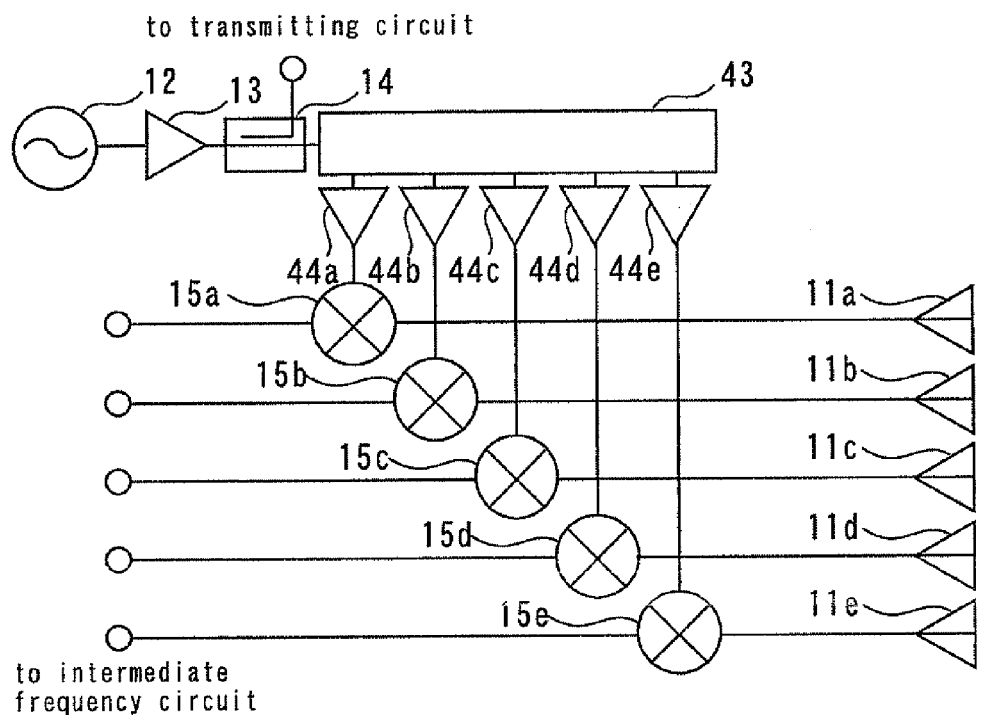
FIG. 10 is a block diagram showing another example of a conventional transmitter and receiver circuit.

FIG. 8 is a circuit diagram showing a switch and a mixer when two mixers are used in a transmitter and receiver circuit according to the third embodiment of the present invention. The switch 16 has switching terminals 31a and 31b for supplying bias voltages; transmission lines 35a and 35b installed between the local oscillator 12 and mixers 15a and 15b, respectively; transistors 36a and 36b, which are switching elements, installed between the connecting points of the transmission lines 35a and 35b to the mixers 15a and 15b, respectively; and RF chokes 33a and 33b each one end of which is connected to the switching terminals 31a and 31b, respectively, and each other end of which is connected to the gate of the transistors 36a and 36b, respectively. Each of the transmission lines 33a and 35b has a length of ¼ the wavelength of the local oscillation signals. Here, since the mixers 15a and 15b are harmonic mixers and the frequency of the local oscillation signals is ½ the frequency of the high-frequency signals, each of the transmission lines 35a and 35b has a length of ½ the wavelength of the high-frequency signals.

Since there are two transmission lines 35a and 35b, the length between points Q1 and Q2 is the length of one wavelength of the high-frequency signals. Therefore, when the transistor 36b is ON and the high-frequency signals are short-circuited at the point Q2, they are also short-circuited at the point Q1 one wavelength apart from Q2. Thus, the transistor 36b in the side of the mixer 15b that is not used is turned on, and a short-circuiting point is generated at the LO terminal 22a of the mixer 15a that is used to short-circuit the high-frequency signals. Thereby, in the mixers 15a and 15b, since the short stubs 29a and 29b shown in FIGS. 2 and 5 in the first embodiment can be omitted, the chip area of the mixers can be reduced.

Although the harmonic mixer wherein the frequency of local oscillation signals is ½ the frequency of high-frequency signals was described in the third embodiment, high-order harmonic mixers wherein the frequency of local oscillation signals is ¼, ⅙, ⅛ or the like the frequency of high-frequency signals also have the equivalent effect.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2006-272063, filed on Oct. 3, 2006 including specification, claims, drawings and summary, on which the Convention priority of the present application is based, are incorporated herein by reference in its entirety.

What is claimed is:

1. A transmitter and receiver circuit comprising:
a plurality of antennas for receiving high-frequency signals,
a local oscillator for generating a local oscillation signal,
a plurality of mixers, each mixer being directly connected to a corresponding one of the antennas, for converting the frequency of the high-frequency signals received through the corresponding antenna, in response to input of the local oscillation signal, to the respective mixer, and
a switch including an input port connected to the local oscillator and a plurality of output ports, each output port being connected to a corresponding mixer, for selectively supplying the local oscillation signal to a selected one of the output ports, whereby, when the output port selected is connected to one of the mixers, a receiving channel is selected by switching of the switch, wherein the switch includes a transmitter circuit output port connected to a transmitting circuit for supplying the oscillator signal to the transmitting circuit, so that transmitting and receiving by the transmitting and receiver circuit are controlled by switching of the switch.

2. A transmitter and receiver circuit comprising:

a plurality of antennas for receiving high-frequency signals, a local oscillator for generating a local oscillation signal, a plurality of mixers, each mixer being directly connected to a corresponding one of the antennas, for converting the frequency of the high-frequency signals received through the corresponding antenna, in response to input of the local oscillation signal, to the respective mixer, and a switch including an input port connected to the local oscillator and a plurality of output ports, each output port being connected to a corresponding mixer, for selectively supplying the local oscillation signal to a selected one of the output ports, whereby, when the output port selected is connected to one of the mixers, a receiving channel is selected by switching of the switch, wherein the switch comprises a plurality of transmission lines, each transmission line being located between the local oscillator and a respective one of the mixers, each transmission line having a length of ¼ of the wavelength of the local oscillation signal, and a plurality of switching elements, each switching element being located between (i) a respective connecting point of one of the transmission lines and the corresponding mixer and (ii) a grounding point.

3. The transmitter and receiver circuit according to claim 2, wherein the switching elements are diodes.

4. The transmitter and receiver circuit according to claim 2, wherein the switching elements are transistors.

5. The transmitter and receiver circuit according to claim 2, wherein the switching elements include micro electro mechanical systems switches.

6. The transmitter and receiver circuit according to claim 2, wherein the switch includes a transmitter circuit output port connected to a transmitting circuit for supplying the oscillator signal to the transmitting circuit, so that transmitting and receiving by the transmitting and receiver circuit are controlled by switching of the switch.

* * * * *